United States Patent
Demaine et al.

[11] 3,853,387
[45] Dec. 10, 1974

[54] VARIABLE MAGNIFICATION LENS ASSEMBLY HAVING TWO ODD-LENSES

[75] Inventors: David G. A. Demaine; John M. Palmer, both of Leeds, England

[73] Assignee: Rank Xerox Limited, London, England

[22] Filed: June 19, 1973

[21] Appl. No.: 371,458

[52] U.S. Cl. .................. 350/183, 350/184, 350/187
[51] Int. Cl. ........................................... G02b 15/10
[58] Field of Search ............ 350/183, 184, 220, 187

[56] References Cited
UNITED STATES PATENTS

| | | |
|---|---|---|
| 3,592,531 | 7/1971 | McCrobie .......................... 350/220 |
| 3,600,066 | 8/1971 | DelVecchio ........................ 350/183 |
| 3,672,748 | 6/1972 | Doi et al. ............................ 350/220 |
| 3,741,621 | 6/1973 | McCrobie .......................... 350/183 |

*Primary Examiner*—John K. Corbin
*Attorney, Agent, or Firm*—Robert J. Bird

[57] ABSTRACT

A variable magnification add-lens in which a basic lens group is movable between fixed conjugate planes. An add-lens is selectively positionable in the optical axis at each end of the basic group to vary its magnification.

4 Claims, 1 Drawing Figure

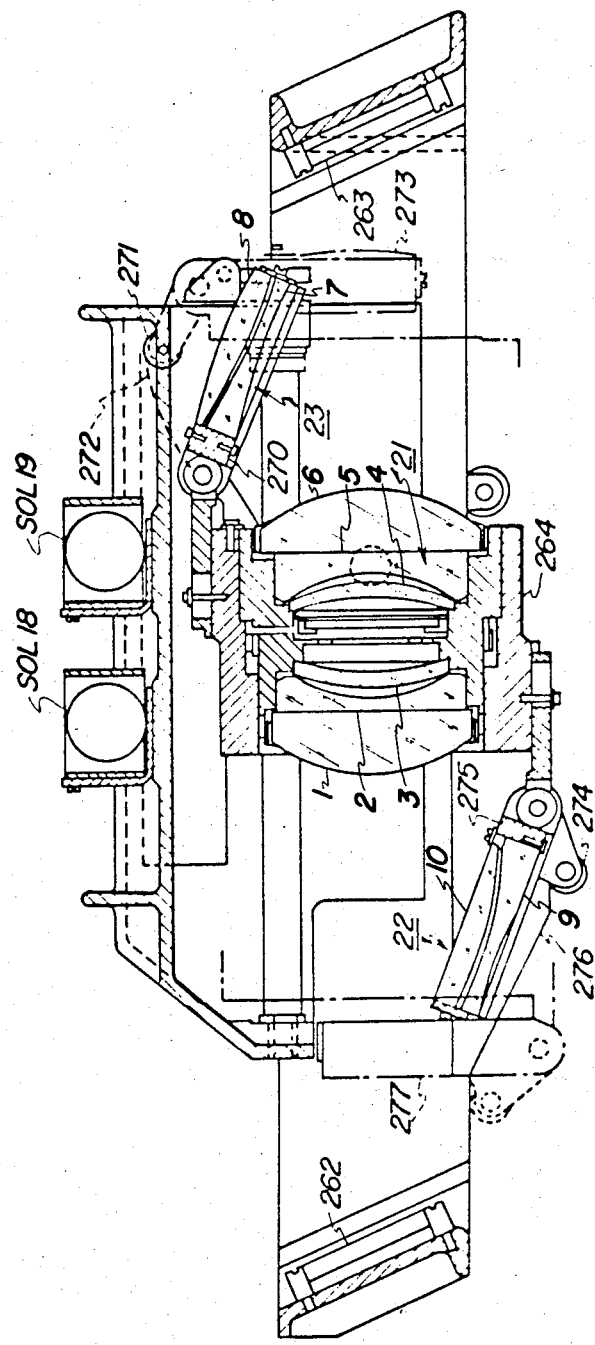

VARIABLE MAGNIFICATION LENS ASSEMBLY HAVING TWO ADD-LENSES

This invention relates to a lens assembly.

According to one aspect of the invention there is provided a lens assembly comprising six lens elements arranged in a substantially symetrical arrangement of two groups of three elements, the outermost pair of elements of each group of three being a cemented doublet with the outermost element of each doublet being bi-convex and the innermost element of each being bi-concave, the innermost element of each group of three being concavo-convex with its convex surface outermost.

The invention is particularly, although not exclusively, concerned with a lens assembly suitable for projecting images of an object in a selected one of plurality of magnification modes, the lens assembly being moved along its optical axis to obtain the different magnifications, while at the same time maintaining constant conjugate separation.

According to another aspect of the present invention there is provided a lens assembly comprising a main lens for producing an image of an object in a first magnification mode, and two add-lenses for supplementing the main lens respectively in each of second and third magnification modes in which the main lens is moved along its optical axis in one direction in the second mode and in the opposite direction in the third mode, the second and third modes producing image sizes which are respectively greater and smaller than the image size produced in the first mode.

A lens assembly in accordance with the present invention will now be described, by way of example only, with reference to the accompanying drawing, which is a cross sectional elevation of the lens assembly.

Referring to the drawing, there is shown a lens assembly for use in a copying machine, and for producing copies in any one of three magnification modes, while maintaining, by movement of the lenses only, a constant conjugate length. Forming part of the optical assembly of the machine are a first mirror 262, and a second mirror 263, which are mounted kinematically, so that there is no residual force moment about the plane of the mirrors. The mirrors, and other parts of the optical system of the machine (not shown in the drawing) remain in fixed positions, regardless of the magnification mode selected.

The three magnification modes are a 100 percent mode, in which the copy is substantially the same size as the original document; and two reduction modes, in which the copy is respectively 70 percent and 50 percent of the size of the original document. In the 70 percent mode, only the main lens 21 is used, whereas in the 100 percent mode, add-lens 22 is swung into the optical path as the main lens 21 is moved to a position closer to the first mirror 262. In the 50 percent mode, the main lens 21 is used in conjunction with add-lens 23, which is moved into the optical path as the main lens is moved towards upper mirror 263. The add-lenses 22 and 23 are swung into and out of the optical path as the main lens moves by means of ramp cams.

In the drawing, the lens assembly is shown in the 70 percent mode position, with both the add-lenses 22 and 23 swung out of the optical path. If now the lens is brought into its 50 percent mode position, i.e. from left to right as seen in the drawing add-lens 23 is swung into the optical path. The mount 270 of add-lens 23 carries a small wheel 271 which travels along a ramp cam surface 272 as the lens is driven towards its 50 percent position. In the drawing, the position of add-lens 23 when the lens is in its 50 percent position is shown by broken outline 273. Wheel 271 is only visible with the add-lens 23 in this position, being out of sight behind main lens 21, as seen in the drawing, when in the 70 percent position. Similarly, when the lens is moved into its 100 percent mode position, add-lens 22 is swung into the optical path by means of wheel 274 carried on the lens mount 275 on add-lens 22, the wheel 274 running along a second ramp cam surface 276. The position of add-lens 22 when the lens is in its 100 percent mode position is indicated by broken outline 277.

Referring now more particularly to the lenses, the main lens consists of 6 elements, numbered 1 to 6 from left to right as seen in the drawing. The lens is of generally symmetrical configuration, with two groups of three elements. Lens elements 1 and 2 are a cemented doublet, as are lens elements 5 and 6. Elements 1 and 6 are bi-convex lenses, with their innermost surfaces having a very large radius of curvature. Lens elements 2 and 5 are bi-concave elements, with their outer surfaces cemented to the inner surfaces of elements 1 and 6 respectively. Lens elements 3 and 4, the innermost elements of each set of three elements, are concavo-convex elements, with their convex surfaces outermost. The refractive indices of elements 2 and 5 are less than those of any of the other elements.

The constructional details of the main lens are set out in table 1 below.

In the 50 percent mode, the add-lens 23 is brought into the optical path, so that there is only a short air space between adjacent surfaces of the two lenses. Add-lens 23 consists of two lens elements 7 and 8, element 7 being a bi-concave element, and element 8 being a bi-convex element. Table 2 below sets out the constructional parameters of the 50 percent add-lens 23.

In the 100 percent mode, add-lens 22 is brought into the optical path, with only a short air space between the adjacent lens surfaces. Add-lens 22 consists of two lens elements 9 and 10, element 9 being a bi-concave element, and element 10 being a bi-convex element. Table 3 below gives the constructional parameters for the 100 percent add-lens 22.

TABLE 1

| ITEM | RADIUS (inches) | AXIAL THICKNESS (inches) | REFRACTIVE INDEX | CLEAR APERTURE |
|---|---|---|---|---|
| OBJECT PLATEN | PLANE PLANE | 0.47240 | A | |
| AIR | | 28.41036 | 1.0 | |
| LENS 1 | 3.4665 | | | 4.02 |
| | | 1.20078 | B | |
| | −216.772 | | | 3.38 |

TABLE 1—Continued

| ITEM | RADIUS (inches) | AXIAL THICKNESS (inches) | REFRACTIVE INDEX | CLEAR APERTURE |
|---|---|---|---|---|
| LENS 2 | −216.772 | 0.27108 | C | 3.38 |
|  | 2.570 |  |  | 2.60 |
| AIR |  | 0.18611 | 1.0 |  |
| LENS 3 | 4.2202 | 0.30986 | B | 2.56 |
|  | 6.5586 |  |  | 2.34 |
| AIR |  | 0.68583 | 1.0 |  |
| STOP |  |  |  | 1.43 |
| AIR |  | 0.70228 | 1.0 |  |
| LENS 4 | −6.5586 | 0.31430 | D | 2.34 |
|  | −4.1322 |  |  | 2.56 |
| AIR |  | 0.22659 | 1.0 |  |
| LENS 5 | −2.5575 | 0.38078 | C | 2.64 |
|  | 216.772 |  |  | 3.57 |
| LENS 6 | 216.772 | 1.14532 | B | 3.57 |
|  | −3.4834 |  |  | 4.11 |
| AIR |  | 19.6750 | 1.0 |  |
| IMAGE SURFACE |  |  |  |  |

TABLE 2

| ITEM | RADIUS (inches) | AXIAL THICKNESS (inches) | REFRACTIVE INDEX | CLEAR APERTURE |
|---|---|---|---|---|
| OBJECT PLATEN | AS TABLE 1 |  |  |  |
| AIR |  | 31.90741 | 1.0 |  |
| LENS 1 LENS 2 AIR LENS 3 AIR | AS TABLE 1 |  |  |  |
| STOP |  |  |  | 1.14 |
| AIR LENS 4 AIR LENS 5 LENS 6 | AS TABLE 1 |  |  |  |
| AIR |  | 0.20 | 1.0 |  |
| LENS 7 | −14.0010 | 0.30 | F | 4.35 |
|  | 25.7810 |  |  | 4.75 |
| AIR |  | 0.06 | 1.0 |  |
| LENS 8 | 25.078 | 0.44 | G | 4.85 |
|  | −13.5857 |  |  | 4.91 |
| AIR |  | 15.19145 | 1.0 |  |
| IMAGE SURFACE |  |  |  |  |

TABLE 3

| ITEM | RADIUS (inches) | AXIAL THICKNESS (inches) | REFRACTIVE INDEX | CLEAR APERTURE |
|---|---|---|---|---|
| OBJECT PLATEN | AS TABLE 1 | | | |
| AIR | | 22.64466 | 1.0 | |
| LENS 9 | −57.038 | 0.30000 | E | 4.91 |
|  | 7.368 | | | 4.56 |
| AIR | | 0.11770 | 1.0 | |
| LENS 10 | 7.614 | 0.50000 | E | 4.52 |
|  | −72.080 | | | 4.46 |
| AIR | | 0.50000 | 1.0 | |
| LENS 1, LENS 2, AIR, LENS 3, AIR | AS TABLE 1 | | | |
| STOP | | | | 1.73 |
| AIR, LENS 4, AIR, LENS 5, LENS 6 | AS TABLE 1 | | | |
| AIR | | 24.43274 | 1.0 | |
| IMAGE SURFACE | | | | |

In tables 1, 2, and 3, the refractive indices are as follows:

|   | n(404.7) | n(435.8) | n(486.1) |
|---|---|---|---|
| A | 1.53735 | 1.53338 | 1.52860 |
| B | 1.64185 | 1.63698 | 1.63113 |
| C | 1.56931 | 1.56355 | 1.55679 |
| D | 1.64120 | 1.63634 | 1.63050 |
| E | 1.52976 | 1.52621 | 1.52190 |
| F | 1.56914 | 1.56337 | 1.55661 |
| G | 1.64183 | 1.63696 | 1.63111 |

What is claimed is:

1. A lens assembly comprising six elements disposed along an optical axis and arranged in a substantially symmetrical arrangement of two groups of three elements, the outermost pair of elements of each group of three being a cemented doublet with the outermost element of each doublet being bi-convex and the innermost element of each doublet being bi-concave, the innermost element of each group of three being concavo-convex with its convex surface outermost, the lens assembly being according to the following constructural data:

| ITEM | RADIUS (inches) | AXIAL THICKNESS (inches) | REFRACTIVE INDEX |
|---|---|---|---|
| OBJECT PLATEN | PLANE | 0.47240 | N(404.7) = 1.53735 |
|  | PLANE |  | N(435.8) = 1.53338 |
|  |  |  | N(486.1) = 1.52860 |
| AIR |  | 28.41036 | 1.0 |
| LENS 1 | 3.4665 | 1.20078 | N(404.7) = 1.64185 |
|  | −2.6,772 |  | N(435.8) = 1.63698 |
|  |  |  | N(486.1) = 1.63113 |
| LENS 2 | −216.772 | 0.27108 | N(404.7) = 1.56931 |
|  | 2.570 |  | N(435.8) = 1.56355 |
|  |  |  | N(486.1) = 1.55679 |
| AIR |  | 0.18611 | 1.0 |
| LENS 3 | 4.2202 | 0.30986 | N(404.7) = 1.64185 |
|  | 6.5586 |  | N(435.8) = 1.63698 |
|  |  |  | N(486.1) = 1.63113 |
| AIR |  | 0.68583 | 1.0 |
| STOP |  |  |  |
| AIR |  | 0.70228 | 1.0 |
| LENS 4 | −6.5586 | 0.31430 | N(404.7) = 1.64120 |
|  | −4.1322 |  | N(435.8) = 1.63634 |
|  |  |  | N(486.1) = 1.63050 |
| AIR |  | 0.22659 | 1.0 |
| LENS 5 | −2.5575 | 0.38078 | N(404.7) = 1.56931 |
|  | 216.772 |  | N(435.8) = 1.56355 |
|  |  |  | N(486.1) = 1.55679 |
| LENS 6 | 216.772 | 1.14532 | N(404.7) = 1.64185 |
|  | −3.4834 |  | N(435.8) = 1.63698 |
|  |  |  | N(486.1) = 1.63113 |
| AIR |  | 19.6750 | 1.0 |
| IMAGE SURFACE |  |  |  |

2. A lens assembly as defined in claim 1 further including an add-lens at each end of said assembly for selective positioning into said optical axis to vary the magnification of said lens assembly, said add-lenses combining with said lens assembly according to the following constructural data:

| ITEM | RADIUS (inches) | AXIAL THICKNESS (inches) | REFRACTIVE INDEX |
|---|---|---|---|
| LENS 9 | −57.038 | | N(404.7) = 1.52976 |
| | | 0.30000 | N(435.8) = 1.52621 |
| | 7.368 | | N(486.1) = 1.52190 |
| AIR | | 0.11770 | 1.0 |
| LENS 10 | 7.614 | | N(404.7) = 1.52976 |
| | | 0.50000 | N(435.8) = 1.52621 |
| | −72.080 | | N(486.1) = 1.52190 |
| AIR | | 0.50000 | 1.0 |
| LENS 1 | | | |
| LENS 2 | | | |
| AIR | | | |
| LENS 3 | | | |
| AIR | | | |
| STOP | | | |
| AIR | | | |
| LENS 4 | | | |
| AIR | | | |
| LENS 5 | | | |
| LENS 6 | | | |
| AIR | | 0.20 | 1.0 |
| LENS 7 | −14.0010 | | N(404.7) = 1.56914 |
| | | 0.30 | N(435.8) = 1.56337 |
| | 25.7810 | | N(486.1) = 1.55661 |
| AIR | | 0.06 | 1.0 |
| LENS 8 | 25.078 | | N(404.7) = 1.64183 |
| | | 0.44 | N(435.8) = 1.63696 |
| | −13.5857 | | N(486.1) = 1.63111 |

3. A lens assembly as defined in claim 1, further including an add-lens at the end of said assembly adjacent lens 1 for positioning into said optical axis to vary the magnification of said lens assembly, said add-lens combining with said lens assembly according to the following constructional data:

| ITEM | RADIUS (inches) | AXIAL THICKNESS (inches) | REFRACTIVE INDEX |
|---|---|---|---|
| LENS 9 | −57.038 | | N(404.7) = 1.52976 |
| | | 0.30000 | N(435.8) = 1.52621 |
| | 7.368 | | N(486.1) = 1.52190 |
| AIR | | 0.11770 | 1.0 |
| LENS 10 | 7.614 | | N(404.7) = 1.52976 |
| | | 0.50000 | N(435.8) = 1.52621 |
| | −72.080 | | N(486.1) = 1.52190 |
| AIR | | 0.50000 | 1.0 |

4. A lens assembly as defined in claim 1, further including an add-lens at the end of said assembly adjacent lens 6 for positioning into said optical axis to vary the magnification of said lens assembly, said add-lens combining with said lens assembly according to the following constructional data:

| ITEM | RADIUS (inches) | AXIAL THICKNESS (inches) | REFRACTIVE INDEX |
|---|---|---|---|
| AIR | | 0.20 | 1.0 |
| LENS 7 | −14.0010 | | N(404.7) = 1.56914 |
| | | 0.30 | N(435.8) = 1.56337 |
| | 25.7810 | | N(486.1) = 1.55661 |
| AIR | | 0.06 | 1.0 |
| LENS 8 | 25.0780 | | N(404.7) = 1.64183 |
| | | 0.44 | N(435.8) = 1.63696 |
| | −13.5857 | | N(486.1) = 1.63111 |

* * * * *